March 3, 1936.  E. J. SVENSON  2,032,817

PLASTIC LUBRICATING SEAL

Filed March 17, 1932

Inventor:
Ernest J. Svenson
By Cheever, Cox & Moore
Attys.

Patented Mar. 3, 1936

2,032,817

UNITED STATES PATENT OFFICE 2,032,817

PLASTIC LUBRICATING SEAL

Ernest J. Svenson, Rockford, Ill.

Application March 17, 1932, Serial No. 599,458

5 Claims. (Cl. 286—9)

My invention relates generally to fluid sealing devices, and particularly to devices for sealing lubricants within a bearing structure.

In using various types of spindle or shaft bearings, for example, those commonly referred to as anti-friction bearings, lubricant must be maintained in association therewith. Thus, some means must be provided to prevent the leakage of fluid along the journal, and heretofore sealing devices including raw hides, packings, and the like, with which I am familiar, have been employed, but these conventional sealing devices present numerous difficulties and disadvantages incident to their use. One of these disadvantages resides in the fact that the sealing material, such as raw hide, in order to be removed and replaced, necessitates removal of bearing parts, and this requires considerable time and expense. Furthermore, I have found that conventional types of sealing devices tend to wear out the journal, and are not suitable for shafts or spindles driven at high speeds. Wear on the journal causes a certain amount of abrasive material to contact with the bearing surface and considerably shortens the life thereof.

It is therefore one of the primary objects of my present invention to overcome the above mentioned and other difficulties and disadvantages heretofore experienced, by providing an improved effective device which may be used in association with a journal or bearing without subjecting the parts to wear, and which may be replaced or replenished without the necessity of dismantling the bearing structure.

Another object of my invention is to provide a relatively simple and inexpensive sealing mechanism of the type set forth, which is particularly adapted for use with machine parts driven at very high speeds.

It is also an object of my invention to provide a sealing device which will not only prevent the leakage of fluid, such as a lubricant, from a bearing chamber, but will also prevent grit and other foreign matter from getting into the bearing structure.

More specifically, it is an object of my invention to enable the use of plastic or impressionable material, for example, graphite in combination with grease and a suitable binder, as an effective means for sealing lubricant or similar substances against leakage along a bearing journal.

In addition to the above mentioned objects and advantages, my invention also contemplates the provision of a sealing device, which not only prevents the leakage of lubricant from a bearing chamber, but also serves as a source of lubricant supply, and to this end I propose to employ a substance, such as grease, which serves the above mentioned dual purpose.

Further, it is an object of my invention to provide a sealing device which is so constructed and arranged as to enable the employment of pressure resulting from centrifugal force during the rotation of a spindle or shaft to enhance the sealing effectiveness of a retained plastic or impressionable body.

More specifically, my invention contemplates the provision, in combination with a rotary member, such as a shaft or spindle and a fluid retaining chamber associated therewith, of a sealing device including annular retaining means for securing plastic or impressionable sealing material against axial and radial displacement, whereby to prevent migration or leakage of lubricant from said chamber, and also to prevent grit from entering said chamber.

My invention also contemplates a new and improved method of sealing fluid along a journal surface which consists in retaining a body of plastic or impressionable material in operative association with said journal during its rotation in a position so as to prevent leakage of fluid past said plastic body.

The foregoing and numerous other objects and advantages will be more apparent from the following detailed description when considered in connection with the accompanying drawing, wherein—

Figures 1, 2, 3, 4:
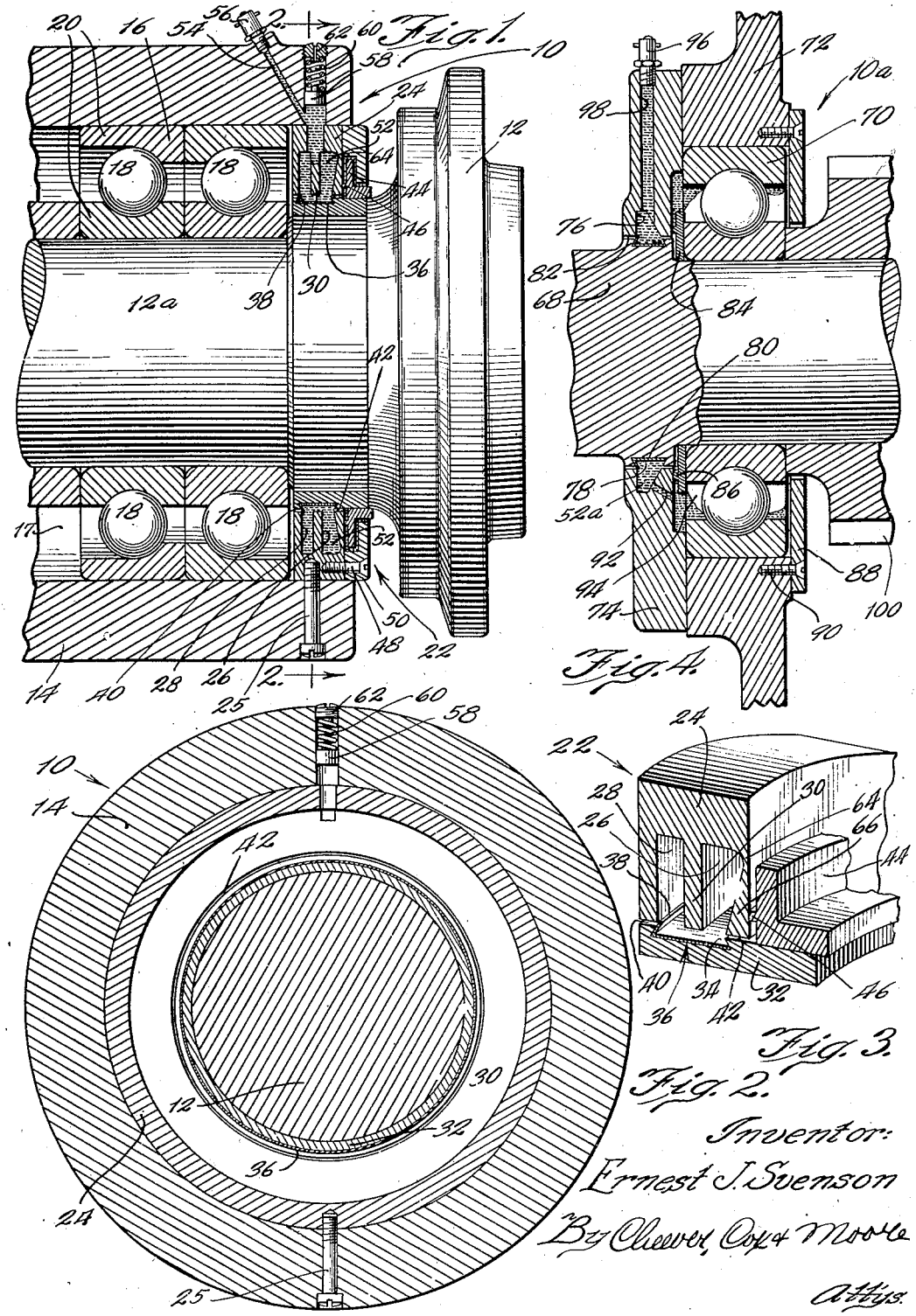
Figure 1 is a fragmentary central vertical sectional view of a bearing structure and associated spindle equipped with a sealing device which is representative of one embodiment of my invention.
Figure 2 is a transverse sectional view taken substantially along the line 2—2 of Figure 1.
Figure 3 is an enlarged detail perspective view of the parts which retain the sealing material.
Figure 4 discloses a bearing structure equipped with a modified sealing device, wherein the plastic sealing material not only serves to prevent the leakage of lubricant from the bearing structure, but also provides a source of lubricant supply for said structure.

Referring now to the drawing more in detail wherein like numerals have been employed to designate similar parts throughout the various figures, it will be seen that for the purpose of illustrating one practical application of my invention, I have disclosed a bearing structure designated generally by the numeral 10, which serves as a support for a machine spindle 12. This type of spindle and bearing structure is particularly adaptable for use in high speed machine tools, such as lathes, wherein it is desirable to maintain the rotation of the spindle at relatively high speeds, for example, 5,000 to 6,000 peripheral feet per minute.

The bearing structure 10 includes a suitable frame 14, which carries a ball bearing structure 16 of the preloaded type within a chamber 17. That is to say, the bearing structure 16 is of the type wherein the balls 18 are initially combined with races 20 under pressure, and in this manner said balls are "preloaded". The specific ball bearing structure per se does not form a part of the present invention, except as it enters into the general combination of parts about to be described. Bearings 16 provide a support for the journal section 12a of the spindle 12, and it is essential that these bearings be continuously provided with lubricant. In other words, it is very desirable to prevent any leakage of lubricant from the bearing chamber 17 along the journal section of the spindle 12, and to accomplish this I have provided a novel sealing device or mechanism which I have designated generally by the numeral 22, Figures 1 and 3. This sealing device 22 includes an annular retainer member 24 which is secured against rotation within the frame 14 by means of a screw 25, and is formed with grooves 26 and 28 separated by an annular section or partition 30. Operatively associated with the retainer member 24 and rotatable with the spindle 12 is a companion retainer member 32, which is provided with a groove 34 of dovetailed cross section. This groove 34 opens into or communicates with the grooves 26 and 28, as clearly shown in Figures 1 and 3. A resilient ring or shim 36 is lodged within the dovetailed groove 34, and one edge of this shim is provided with a resilient flange 38 which extends outwardly from the groove 34 a sufficient distance to completely traverse the small annular space 40 between the retainer member 24 and the companion retainer member 32, Figure 3. A similar space 42 separates said retainer members at the opposite side of the groove 34.

A sealing ring 44 carried by the retainer member 32 is provided with a small axially extending annular projection 46, which is adapted to engage the outer face or surface of the retainer member 24. Extending over a portion of this sealing ring 44 and secured to the outer face of the retainer member 24 by means of screws 48, Figure 1 is a cap 50. This cap cooperates with the other elements to prevent dust and other foreign particles from entering the grooves in the retainer members 24 and 32.

The retainer grooves 26, 28, and 34 just described are adapted to receive moldable or impressionable material 52, as clearly shown in Figure 1, and this material may be inserted under pressure through a duct 54 having an external communication through a suitable valve 56. I have also shown a plunger 58 which is continuously urged inwardly through the action of a coil spring 60, which bears against a screw 62. In this manner the plunger 58 is continuously maintained under pressure against the sealing material.

This sealing material or body 52 may be formed of any suitable plastic or moldable material which will provide an effective seal to prevent the flow or migration of fluid from the bearing chamber 17 along the periphery of the spindle 12. One form of seal which I have found to be very satisfactory is a composition of grease, graphite, and suitable binding material. It will be apparent from the foregoing description that, when the spindle 12 experiences rotation, centrifugal force acting upon the sealing material 52, will cause said material to exert a pressure within the communicating grooves 26, 28, and 34. The dovetailed arrangements of the groove 34 serves to oppose the tendency of the material to move outwardly or away from the body of the shim 36, and it will also be seen that the pressure of the material 52 acting upon the flange 38 of said shim, will cause said flange to more effectively bear against the inner adjacent edge of the stationary retainer 24. In this manner the flange 38 enhances the sealing effectiveness of the device in preventing the leakage of fluid from the space 40 into the communicating grooves of the retainer members. Obviously little or no wear is experienced between the flange 38 and the adjacent edge of the retainer member 24, due to the small area contact and to the constant presence of a lubricant.

Attention is also directed to the fact that the groove 26 is so formed as to present a relatively thin area at the location designated by the numeral 64. By this construction the section of the retainer 24 designated by the numeral 66 is rendered yieldable and is urged laterally against the abutting surface of the annular projection 46 in response to the pressure of the sealing material 52 within the groove 26. Maintaining contact between the projection 46 and the outer face of the retainer 24 in the manner described, not only prevents the egress of material, but also prevents any grit or foreign matter from entering the space 42, and ultimately the confined areas of the bearing structure. The area contact made by the annular projection 46 is so small that substantially no wear of the contacting surfaces is experienced. It will also be apparent that the space presented between the sealing ring 44 and the parts positioned adjacent thereto may be provided with a supply of the lubricating material, thereby insuring proper lubrication between the contacting surface of the projection 46 and the adjacent surface of the retainer 24. In the type of bearing structure just described only a film of lubricant is required to maintain the same in proper operating condition, and therefore it is of the utmost importance that this relatively small volume of lubricant be retained in operative association with the bearing parts. In other words, the sealing device must positively insure against the leakage of any appreciable fluid from the bearing chamber. I have found that my improved sealing device serves as a very efficient means for securing against leakage, and that said device is particularly adapted to be used in connection with high speed spindle or shaft rotation. It has been the experience of those acquainted with the designing of machines, in which spindles must be rotated at relatively high speeds, that one of the most serious problems has been that of maintaining a proper supply of lubricant for the bearings over an extended period of time. I have employed the spindle and bearing structure disclosed in Figures 1 and 2 on heavy duty high speed lathes in combination with the disclosed fluid sealing device, and during such high speed heavy duty functioning, said device has positively sealed the lubricant within the bearing chamber.

In Figure 4 I have disclosed a modified sealing device in combination with a bearing structure, designated generally by the numeral 10a, which is employed in instances where high speed rotation is not required. This structure includes a spindle 68 rotatable within a ball bearing structure 70 mounted within a suitable frame 72. A retainer member 74 corresponding to the retainer member 24 just described is secured in any suitable manner to the outer face of the frame 72, and is formed with an annular groove 76 for retaining a sealing body 52a, which is similar in certain respects to the sealing material or body 52. The groove 76 cooperates with a companion groove 78 of dovetailed cross section provided within the spindle 68 to maintain the sealing body 52a in proper sealing position. A shim 80 corresponding to the shim 36 previously described functions to prevent the egress of sealing material through a space 82, and likewise prevents the ingress of grit and other foreign particles. A sealing ring 84 is positioned between the bearing 70 and the inner face of the retainer member 74, and is provided with an annular projection 86 which engages said surface. Another ring or disk 88 is secured to the inner face of the frame 72 by means of screws 90, and serves to prevent fluid in contact with the member or gear 100 on the spindle 68 from entering the bearing chamber.

The bearing structure 10a, like the structure 10, is of a type which normally requires the area within a chamber 94 which houses the ball bearing structure 70, to be constantly provided with lubricant. It will be seen that I provide a communicating duct 92, which extends between the groove 76 and the bearing chamber 94. The material or substance which I employ to provide the annular sealing body 52a is similar to the lubricating grease which is required within the bearing chamber 94. By having a properly restricted orifice such as the orifice or duct 92 located remotely with respect to the intake duct 98, the cooperative grooves 76 and 78 will be completely filled with grease before any of said grease enters the bearing chamber 94. In fact the arrangement of the retainer, duct, etc., is such that each time a charge of grease is introduced within the duct 98, a small supply of lubricant issues from the restricted duct 92. In this manner only a limited quantity of lubricant is supplied to the bearing chamber 94, which is sufficient to maintain the antifriction bearing in proper running order. If too much grease or lubricant is supplied to an anti-friction bearing, unsatisfactory results are occasioned, due to the development of heat. However, if a proper minimum quantity of lubricant is maintained within the chamber, the bearing will function without developing a deleterious rise in temperature. It will be apparent that in this manner I employ the sealing body 52a to serve the dual function of a seal and a source of lubricant supply. The supply of lubricant may be replenished by forcing the same under pressure through a suitable valve 96, which communicates with the groove 76 through a passage 98.

From the foregoing it will be apparent that my invention contemplates the provision of improved means whereby lubricant or other similar material may be positively secured against leakage along the surface of a rotating spindle or bearing, and whereby the introduction of grit or foreign matter is positively precluded. The invention also contemplates a new and improved method of sealing fluid, such as a lubricant, within a bearing chamber, and also a method whereby the material or substance which serves as a seal may also be employed as a source of lubricant supply for the bearing chamber. My structure is extremely simple and hence very inexpensive, and has proven very effective in actual practice. It will be apparent that the sealing material, which might over a period of time slightly decrease in volume, due to slow seepage or migration past the projection 46, Figure 3, may be replenished without the necessity of dismantling any of the associated parts. In fact, it is desirable to maintain the space presented between the sealing ring 44 and the adjacent elements filled with the sealing material in order to positively preclude the entrance of grit. A sealing device of my improved design will not subject the journal section of a spindle or bearing to any wear, and as such, presents a marked improvement over sealing structures employed heretofore.

While I have disclosed specific bearing structures and have set forth a specific composition of grease, graphite and binder which may be used as a semi-fluid or plastic seal, it should be understood that my invention contemplates other forms and modifications, and should only be limited by the scope of the appended claims.

Having thus fully described my invention, what I claim as new and desire to obtain by Letters Patent of the United States is:

1. In combination with rotary means such as a spindle and a fluid chamber associated therewith, sealing means including a body of impressionable sealing material encircling said rotary means and providing an abutment to prevent leakage of fluid from said chamber along the surface of said rotary means, said sealing means comprising a mixture including grease and a non-abrasive binder, means movable with said rotary means and having a recess, and another means having a cooperative recess, said cooperative recesses serving to retain said body of impressionable material in sealing position, one of said recesses being of dovetailed cross section.

2. In combination with rotary means such as a spindle and a fluid chamber associated therewith, sealing means including a body of moldable sealing material encircling said rotary means and providing an abutment to prevent leakage of fluid from said chamber along the surface of said rotary means, and means encircling said rotary means having an annular chamber opening inwardly and secured against rotation for receiving said moldable body, said rotary means being provided with an annular chamber opening outwardly into communication with said first mentioned annular chamber and having an angularly disposed side wall to counteract the outward movement of the body during the movement of said rotary means.

3. A sealing device of the class described including a seal retainer adapted to encircle a rotary means such as a spindle, a plastic body secured against axial displacement within said retainer adapted to co-operate with the peripheral surface of a rotary means to provide a seal, a section of said retainer being yieldable in response to centrifugal pressure exerted by said plastic body when a rotary means associated therewith is moved, and a sealing member adapted to be engaged by said yieldable section whereby to provide a further seal.

4. A sealing device of the class described including a seal retainer adapted to encircle a rotary means such as a spindle, a plastic body secured against axial displacement within said retainer adapted to co-operate with the peripheral surface of a rotary means to provide a seal, a section of said retainer being yieldable in response to centrifugal pressure exerted by said plastic body when a rotary means associated therewith is moved, a sealing member adapted to be engaged by said yieldable section whereby to provide a further seal, and covering means for the member engaged by said yieldable section.

5. A sealing device of the class described for securing a lubricant against leakage along the peripheral surface of a rotary member, an annular body of impressionable material including grease, graphite, and a binder which is adapted to provide a peripheral seal, and means adapted to encircle said rotary member and providing the sole means for retaining the outer portion of said annular body of impressionable material, at least one section of said retaining means being yieldable axially of said rotary member in response to the pressure exerted by said annular body in response to centrifugal force.

ERNEST J. SVENSON.